(12) United States Patent
Adachi et al.

(10) Patent No.: US 9,346,420 B2
(45) Date of Patent: May 24, 2016

(54) WIRE HARNESS

(71) Applicant: YAZAKI CORPORATION, Tokyo (JP)

(72) Inventors: Hideomi Adachi, Shizuoka (JP);
Yoshiaki Ozaki, Shizuoka (JP);
Hidehiro Ichikawa, Shizuoka (JP);
Eiichi Tohyama, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 94 days.

(21) Appl. No.: 14/278,622

(22) Filed: May 15, 2014

(65) Prior Publication Data
US 2014/0246231 A1 Sep. 4, 2014

Related U.S. Application Data

(63) Continuation of application No. PCT/JP2012/080806, filed on Nov. 21, 2012.

(30) Foreign Application Priority Data

Nov. 21, 2011 (JP) ................................ 2011-253419
Jun. 11, 2012 (JP) ................................ 2012-131505

(51) Int. Cl.
*B60R 16/02* (2006.01)
*H02G 3/04* (2006.01)
*H01B 9/04* (2006.01)

(52) U.S. Cl.
CPC ......... *B60R 16/0215* (2013.01); *B60R 16/0207* (2013.01); *H02G 3/0481* (2013.01); *H01B 9/04* (2013.01)

(58) Field of Classification Search
CPC .................................................. B60R 16/0215
USPC ........................................................ 174/72 A
See application file for complete search history.

(56) References Cited

U.S. PATENT DOCUMENTS 3,142,721 A      7/1964   Long
3,828,305 A *   8/1974   Hogendobler ....... H01R 9/0518
                                                      439/585

(Continued)

FOREIGN PATENT DOCUMENTS

CN    102076528 A    5/2011
EP    0 938 102 A2   8/1999

(Continued)

OTHER PUBLICATIONS

International Search Report and Written Opinion of the International Search Report for PCT/JP2012/080806 dated Mar. 5, 2013.

(Continued)

*Primary Examiner* — Timothy Thompson
*Assistant Examiner* — Charles Pizzuto
(74) *Attorney, Agent, or Firm* — Kenealy Vaidya LLP (57) ABSTRACT

A wire harness includes a coaxial conducting wire including a plurality of high voltage paths which are coaxially aligned, a covering member, accommodating the coaxial conducting wire, and a terminal, connected to one of the high voltage paths disposed outside of another one of the high voltage paths, and including a tubular portion coaxial to the coaxial conducting wire. The terminal includes a connection tubular portion as the tubular portion, a crimping tubular portion connecting the one of the high voltage paths to the connection tubular portion by crimping, and an outside connection terminal integrated with the connection tubular portion.

5 Claims, 9 Drawing Sheets

(56) References Cited

U.S. PATENT DOCUMENTS

| | | | | |
|---|---|---|---|---|
| 4,261,632 A | * | 4/1981 | Narozny | H01R 24/40 439/393 |
| 4,317,002 A | | 2/1982 | Spicer | |
| 8,827,744 B2 | * | 9/2014 | Poma | H01R 4/20 439/585 |
| 2004/0099427 A1 | | 5/2004 | Kihira | |
| 2006/0278423 A1 | | 12/2006 | Ichikawa et al. | |
| 2010/0297877 A1 | * | 11/2010 | Nakamura | H01R 9/0518 439/585 |
| 2010/0319956 A1 | | 12/2010 | Ballard et al. | |
| 2011/0088944 A1 | | 4/2011 | Ogue et al. | |
| 2012/0181059 A1 | | 7/2012 | Radermacher et al. | |

FOREIGN PATENT DOCUMENTS

| | | |
|---|---|---|
| EP | 1 113 461 A1 | 7/2001 |
| EP | 2 298 608 A1 | 3/2011 |
| JP | 2002-529299 A | 9/2002 |
| JP | 2004-171952 A | 6/2004 |
| JP | 2007-59085 A | 3/2007 |
| JP | 2009-143326 A | 7/2009 |
| JP | 2009-214631 A | 9/2009 |
| WO | 2011/011776 A1 | 1/2011 |

OTHER PUBLICATIONS

Chinese Office Action for the related Chinese Patent Application No. 201280057211.8 dated Aug. 3, 2015.

European Office Action for the related European Patent Application No. 12 816 365.6 dated Sep. 14, 2015.

Japanese Office Action for the related Japanese Patent Application No. 2012-131505 dated Mar. 8, 2016.

Chinese Office Action for the related Chinese Patent Application No. 201280057211.8 dated Jan. 19, 2016.

* cited by examiner

WIRE HARNESS

CROSS REFERENCE TO RELATED APPLICATIONS

This application is a continuation of PCT application No. PCT/JP/2012/080806, which was filed on Dec. 21, 2012 based on Japanese Patent Application Nos. 2011-253419 filed on Nov. 21, 2011, and 2012-131505 filed on Jun. 11, 2012, the contents of which are incorporated herein by reference.

BACKGROUND OF THE INVENTION

1. Field of the Invention

The invention is related to a wire harness.

2. Description of the Related Art

A high voltage wire harness has been used for electrically connecting; for instance, a battery to an inverter unit, in a hybrid automobile or a pure electric vehicle. The wire harness for connecting the battery to the inverter unit includes two high voltage conducting paths, which are a plus circuit and a minus circuit respectively, and a covering member for protecting them.

When a metallic pipe disclosed in PTL 1 is adopted as the covering member, the two conducting paths are accommodated while arranged side by side within the metallic pipe.

CITATION LIST

Patent Literature

[PTL 1] JP-A-2004-171952

SUMMARY OF THE INVENTION

Since the conducting paths supply electrical power for a drive system, the conducting paths become thick. When the metallic pipe is adopted as a covering member of the wire harness, since two thick conducting paths are accommodated in the covering member while arranged side by side, and the covering member becomes larger in diameter. If the diameter of the covering member becomes larger, a distance between the wire harness and the ground becomes small when the wire harness is routed on an underfloor portion of automobile. Then the wire harness may be damaged or the like.

It is therefore one advantageous aspect of the present invention to provide a wire harness that enables a reduction in the diameter of a covering member.

According to one advantage of the invention, there is provided a wire harness, comprising:

a coaxial conducting wire including a plurality of high voltage paths which are coaxially aligned; and a covering member, accommodating the coaxial conducting wire.

The coaxial conducting wire may further include a shield member that is formed by metal and is coaxial to and disposed outside the plurality of high voltage paths.

The covering member may be formed from a metal tubular body covering the coaxial conducting wire or a resin tubular body covering the coaxial conducting wire.

The covering member may have a bend pipe portion configured to be bent during routing and a non-bend pipe portion continued to the bend pipe portion and configured not to be bent during routing.

The wire harness may be configured such that: the coaxial conductive wire includes an insulator located between the high voltage paths, one of the high voltage paths disposed outside of another one of the high voltage paths is made up of a plurality of conductive strands, and the strands are spirally twisted on an exterior surface of the insulator.

The wire harness may further comprise a terminal, connected to one of the high voltage paths disposed outside of another one of the high voltage paths, and including a tubular portion coaxial to the coaxial conducting wire.

The terminal may include a connection tubular portion as the tubular portion, a crimping tubular portion connecting the one of the high voltage paths to the connection tubular portion by crimping, and an outside connection terminal integrated with the connection tubular portion.

According to the present invention, it is possible to reduce a diameter of the conducting wire itself by means of coaxially arranging a plurality of paths. Moreover, reducing the diameter of the conducting wire also leads to the ability to reduce a diameter of the covering member that accommodates the conducting wire having a small diameter. The conducting wire is, namely, a coaxial conducting wire. According to the invention, when the wire harness is routed on the underfloor portion of the automobile, there is yielded an advantage of the ability to route the wire harness at a larger distance from the ground.

According to the invention, the coaxial conducting wire can be imparted with a shielding function and exhibiting the function by itself.

According to the invention, when the covering member is a metal tubular body, a function of protecting the coaxial conducting wire can be enhanced. And, the covering member can exhibit a shielding function. In the meantime, when the covering member is a resin tubular body, the weight of the covering member can be reduced while necessary and sufficient strength is assured when compared with the case where the covering member is a metal tubular body.

According to the invention, the covering member can obtain a portion suitable for routing.

According to the invention, a diameter of the conducting wire can be reduced. Moreover, flexibility of the conducting wire can be reduced, and terminal work can be facilitated.

According to the invention, the terminal can be coaxially connected to the outside path of the high voltage paths in coaxial conducting wire.

According to the invention, a coupling structure of the terminal for an outside circuit with respect to the outside circuit can be minimized. According to the invention, there is provided a superior coupling structure.

BRIEF DESCRIPTION OF THE DRAWINGS

FIGS. 1A and 1B are diagrams of a wire harness according to a first embodiment of the invention.

DETAILED DESCRIPTION OF THE EXEMPLARY EMBODIMENTS

A wire harness includes a coaxial conducting wire that is a bundle into which a plurality of paths are coaxially tied and an covering member that accommodates the coaxial conducting wire. The coaxial conducting wire is made in the form of a single wire by coaxially tying double circuitry (two paths), triple circuitry (three paths), quadruple circuitry (four paths), . . . n-fold circuitry ("n" paths). Specifically, a second conducting path and a second insulator are provided outside a first conducting path and a first insulator, whereby double circuitry is made. In addition, a third conducting path and a third insulator are provided outside the second conducting path and the second insulator, whereby triple circuitry is made. Further, a fourth conducting path and a fourth insulator are provided outside the third conducting path and the third insulator, whereby quadruple circuitry is made. Moreover, "n" conducting paths and "n" insulators are provided outside the quadruple circuitry, whereby "n"-fold circuitry is made. A coaxial conducting wire having a coaxial single configuration can be obtained.

Figure 1A:
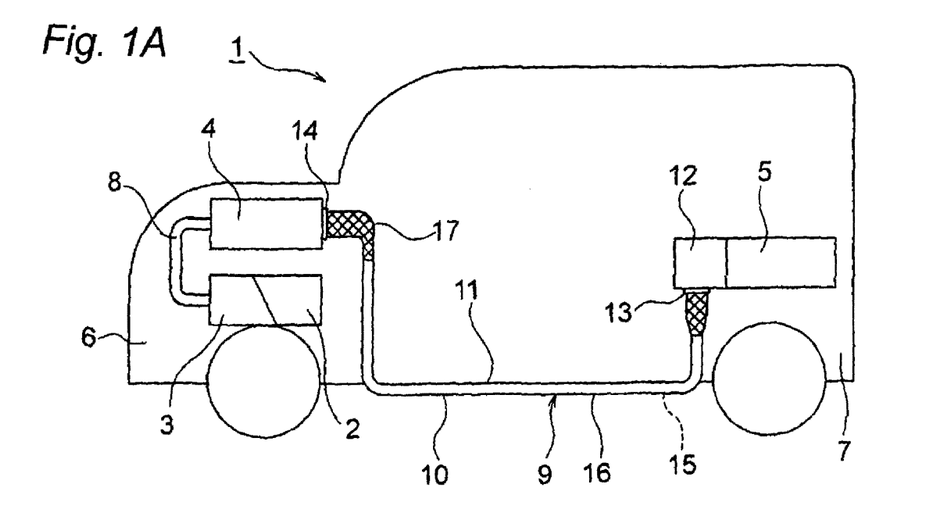
FIG. 1A is a configuration diagram showing a routed state of the wire harness.
Figure 1B:
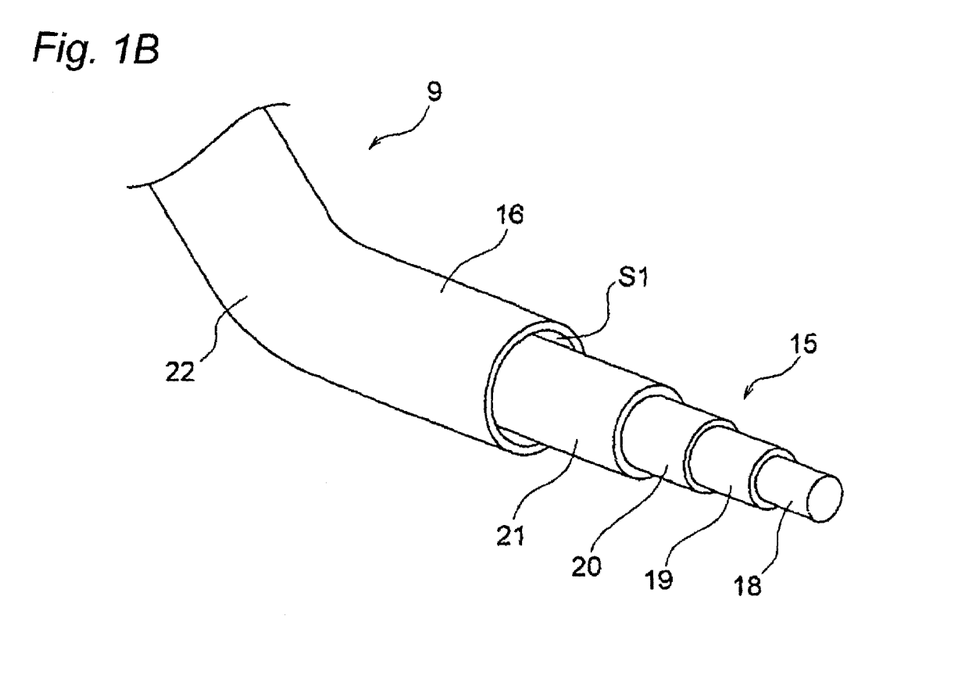
FIG. 1B is a schematic illustration of the wire harness.
Figure 2A:
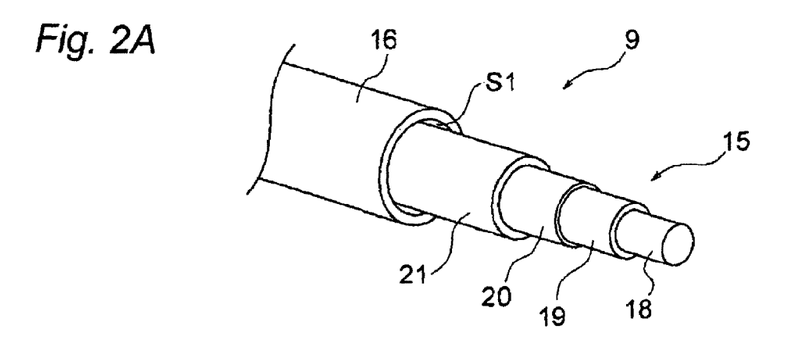
FIG. 2A is a schematic illustration of the wire harness shown in FIG. 1.
Figure 2B:
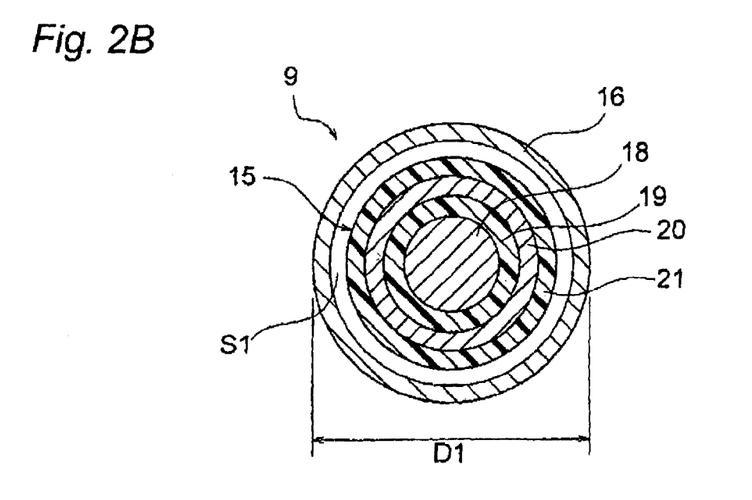
FIG. 2B is a cross section of the wire harness shown in FIG. 1.
Figure 2C:
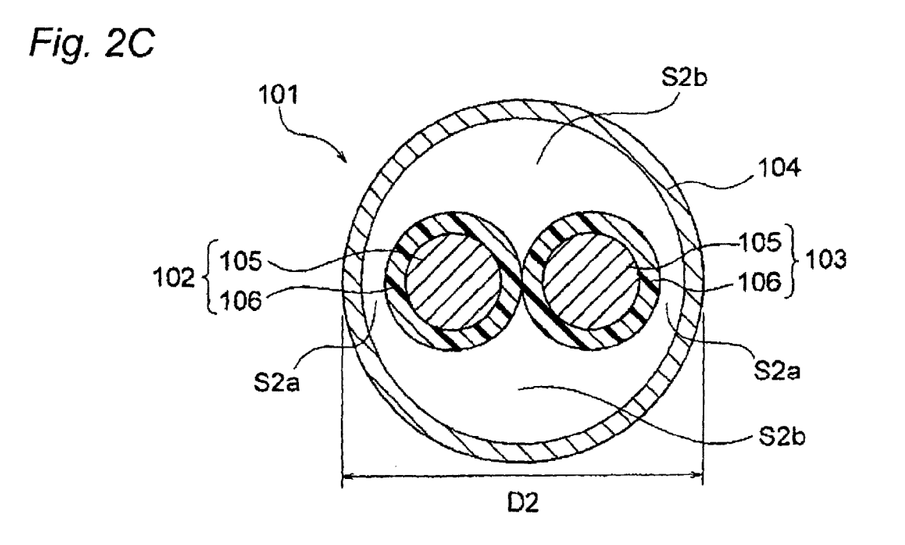
FIG. 2C is a cross section of a wire harness of a comparative example.

A first embodiment is hereunder described by reference to the drawings. FIGS. 1A and 1B are diagrams of a wire harness according to a first embodiment of the invention. FIG. 1A is a configuration diagram showing a routed state of the wire harness and FIG. 1B is a schematic illustration of the wire harness. FIG. 2A is a schematic illustration of the wire harness shown in FIG. 1, and FIG. 2B is a cross section of the wire harness shown in FIG. 1. FIG. 2C is a cross section of a wire harness of a comparative example.

The embodiment shall be explained by reference to an example in which a hybrid automobile adopts the wire harness of the invention. The hybrid vehicle can also be either a pure electric vehicle or a common automobile.

In FIGS. 1A and 1B, reference numeral 1 designates a hybrid automobile. The hybrid automobile 1 is a vehicle that is driven by a mixture of two power sources; namely, an engine 2 and a motor unit 3 and is configured in such a way that the motor unit 3 is supplied with electric power from a battery 5 (a battery pack) by way of an inverter unit 4. The engine 2, the motor unit 3, and the inverter unit 4 are mounted in an engine room 6 where front wheels, or the like, are situated, in the embodiment. The battery 5 is mounted in an automobile rear block 7 where rear wheels, or the like, are situated. The battery can also be mounted in an automobile compartment located behind the engine room 6.

The motor unit 3 and the inverter unit 4 are connected to each other by means of a known high voltage path harness 8.

The battery 5 and the inverter unit 4 are connected together by means of a wire harness 9 of the invention (i.e., a high voltage path harness for an automobile). The wire harness 9 is configured as one intended for use with a high voltage. An intermediate portion 10 of the wire harness 9 is routed on a ground side of a vehicle body underfloor portion 11. The wire harness 9 is also routed substantially in parallel with the vehicle body underfloor portion 11. The vehicle body underfloor portion 11 corresponds to both a known body and a so-called panel member. A through hole (whose reference numeral is omitted) is formed in a predetermined position. The wire harness 9 is inserted into the through hole.

The wire harness 9 and the battery 5 are connected to each other by way of a junction block 12 provided for the battery 5. A rear end 13 of the wire harness 9 is electrically connected to the junction block 12 by means of a known method. A front end 14 of the wire harness 9 is electrically connected to the inverter unit 4 by means of a known method.

The motor unit 3 is configured by inclusion of a motor and a generator. Further, the inverter unit 4 is configured by inclusion of an inverter and a converter. The motor unit 3 is formed as a motor assembly including a shielding case. The inverter unit 4 is formed as an inverter assembly including a shielding case. The battery 5 is an Ni-MH-based or Li-ion-based battery and is module-configured. For instance, a rechargeable battery; for instance, a capacitor, can also be used. The battery 5 is not limited to any specific type, so long as it can be used for the hybrid automobile 1 or the pure electric vehicle.

First, a configuration and structure of the wire harness 9 are described. The wire harness 9 is a high voltage member for electrically connecting the inverter unit 4 to the battery 5 as mentioned above and includes a coaxial conducting wire 15, an covering member 16, and an electromagnetic shield member 17.

In the embodiment, when the covering member 16 does not have a shielding function, the electromagnetic shield member 17 is formed so as to extend long from the inverter unit 4 to the battery 5. In the meantime, when the covering member 16 has a shielding function, the electromagnetic shield member 17 is formed so as to be connected to; for instance, both ends of the covering member 16. When the covering member 16 does not have a shielding function, the electromagnetic shield member 17 is interposed between the coaxial conducting wire 15 and the covering member 16, or the electromagnetic shield member 17 is included in the configuration of the conducting path (which will be described later by reference to FIGS. 4A to 4C, FIGS. 5A to 5C, and FIGS. 6A to 6C). A braid, a metallic foil single body, or a shield member including metallic foil is adopted as the electromagnetic shield member 17. Another example of the electromagnetic shield member is materialized by letting a conductive portion of the covering member 16, which is achieved by; for instance, covering an interior surface of the covering member 16 with metallic foil or forming the covering member 16 from a conductive material, act as an electromagnetic shield member. The electromagnetic shield member 17 is connected to a shielding case, or the like, of the inverter unit 4 directly or by way of an unillustrated connector.

In FIGS. 1A and 1B and FIGS. 2A to 2C, the coaxial conducting wire 15 is configured so as to include both a plus circuit and a minus circuit in the form of a single wire; specifically, configured so as to have double circuitry. More specifically, the coaxial conducting wire 15 is configured so as to include a first conducting path 18 that is situated at a center of the coaxial conducting wire 15 and that has a circular cross sectional profile; a first insulator 19 that sheathes an outer periphery of the first conducting path 18 in a predetermined thickness; a second conducting path 20 laid outside the first insulator 19; and a second insulator 21 that sheathes an outer periphery of the second conducting path 20 in a predetermined thickness.

In the configuration of the coaxial conducting wire 15, the first conducting path 18 corresponds to either a plus conductor or a minus conductor. The second conducting path 20 corresponds to a remaining one of the two.

The first conducting path 18 is manufactured from copper, a copper alloy, aluminum, or an aluminum alloy. The first conducting path 18 can also adopt a conductor structure made by twisting strands or a rod-shaped conductor structure having; for instance, a circular cross sectional profile. A conductor structure will make up a round single core.

The first insulator 19 is a sheath for the first conducting path 18 and formed by extruding a resin material.

The second conducting path 20 is manufactured from copper, a copper alloy, aluminum or an aluminum alloy. The second conducting path 20 is not restricted to any specific structure, so long as the second conducting path can exhibit the function of a remaining one of the two.

A braided conductor made by braiding electrically conductive strands into a tubular shape is assumed to be provided as an example of the second conducting path 20. A metal foil conductor formed by making conductive metal foil into a tubular shape can also be provided as an example of the second conducting path 20. In addition, a spiral conductor made by twisting an electrically conductive metal wire into a spiral structure can also be provided as the example. A metal wire having a circular or rectangular cross sectional profile, a metal wire having the shape of a batten plate, a metal wire made up of a bare electric wire, and the like, can be provided as a metal wire for the spiral conductor.

A pipe conductor made up of an electrically conductive metal pipe is provided as an example of the second conducting path 20. The metal pipe is manufactured by extrusion or rounding a metal plate into a pipe shape. The example of the second conducting path 20 i includes a strand conductor that is made by placing a plurality of electrically conductive strands around the first insulator 19 or a strand conductor made by unbraiding a bare wire and placing the thus-unbraided wire around the first insulator 19. Moreover, a tape conductor using an electrically conductive metal tape is provided as an example of the second conducting path 20.

A conductor cross sectional area, which is a cross sectional area of a portion performing as a conductor, of the second conducting path 20 is set so as to be commensurate with a conductor cross sectional area of the first conducting path 18. If the second conducting path 20 is formed from a braided conductor, a spiral conductor, or a strand conductor, the second conducting path 20 may become longer than the first conducting path 18 in terms of the length of the conductor. In such a case, it is effective to make the conductor cross sectional area of the second conducting path 20 slightly larger than that of the first conducting path 18 so as to absorb a difference in conductor length.

In relation to the conductor cross sectional area, the conductor cross sectional area of the second conducting path 20 is made slightly larger when the conductor cross sectional area (or a conductor diameter) of the second conducting path 20 is set so as to be commensurate with a value of an electric current flowing through the first conducting path 18 performing as a core wire. If the conductor cross sectional area of the second conducting path 20 is set while making an allowance for the difference in conductor length rather than being set so as to exactly match that of the first conducting path 18, the conductor cross sectional area of the second conducting path 20 can be made equal to that of the first conducting path 18 without increasing the conductor cross sectional area. If the allowance is made, the conductor cross sectional area of the second conducting path 20 can also be made slightly smaller.

If the conductor cross sectional area of the second conducting path 20 is made slightly larger, the increase will correspond to a slight increase in the number of ultra-fine strands in a case where the second conducting path 20 is; for instance, a strand conductor, and will not affect the diameter of the coaxial conducting wire 15. In the meantime, when the conductor cross sectional area of the second conducting path 20 is set while making an allowance for the value of the electric current flowing through the first conducting path 18, making the conductor cross sectional area of the second conducting path 20 slightly smaller is effective for reducing the diameter of the coaxial conducting wire 15.

Even when the conductor cross sectional area of the second conducting path 20 is set while making an allowance for the value of the electric current flowing through the first conducting path 18, the conductor cross sectional area including the allowance is extremely small and will not affect the diameter of the coaxial conducting wire 15.

In addition to this, since the conductor cross sectional area of the second conducting path 20 is set in accordance with the conductor cross sectional area of the first conducting path 18, a thickness (wall thickness) of the second conducting path 20 will not increase even when the second conducting path 20 is a pipe conductor made of; for instance, a metal pipe. As a matter of course, the coaxial conducting wire 15 will be significantly smaller than a metal pipe hitherto used as an covering member in terms of a thickness and a diameter.

The second insulator 21 is a sheath for the second conducting path 20 and formed by extrusion of a known resin material. The second insulator 21 is formed as a region for protecting the second conducting path 20. In addition, the second insulator 21 is formed as a region for insulating the second conducting path 20 from a member that exhibits a shielding function.

The covering member 16 is a tubular body made of metal; namely, a metal tubular body, and formed so as to have a length necessary for accommodating the coaxial conducting wire 15 (the covering member is not restricted to a metal tubular body but can also be a tubular body made of a resin or elastomer). In the embodiment, the covering member 16 is formed so as to assume a circular cross sectional profile. The cross sectional profile shall be a mere example and may also be an ellipsoidal shape, an oval shape, or a rectangular shape. Such a covering member 16 is subjected to bending in conformance with a routing path. Reference numeral 22 designates a bending portion.

An aluminum pipe having a circular cross sectional profile is used for the covering member 16 in the embodiment. An inner diameter of the covering member 16 is formed so as to accommodate the coaxial conducting wire 15. The covering member 16 has a thickness of being able to exhibit a protective function. Since the coaxial conducting wire 15 is accommodated, an outer diameter D1 is set to a comparatively small value.

The reason for the outer diameter D1 becoming comparatively smaller is that the coaxial conducting wire 15 has a single wire in which a plurality of circuits are coaxially provided and that the covering member 16 is formed in a size of the order of being able to accommodate the coaxial conducting wire 15. By reference to a comparative example, an explanation will now be given to a case where the covering member 16 will be smaller in diameter than the comparative example.

In FIG. 2B, the coaxial conducting wire 15 having the above configuration is accommodated in the covering member 16. Minimum clearance S1 required during insertion of the coaxial conducting wire 15 is secured between the covering member 16 and the high voltage coaxially composite conducting path 15. For the sake of convenience, the clearance S1 is illustrated as being present uniformly around the coaxial conducting wire 15. In reality the coaxial conducting wire 15, due to its own weight, comes in contact with an interior surface of the exterior cladding member 16. An outer diameter of the covering member 16 is assumed to be D1.

In FIG. 2C, a wire harness 101 which is a comparative example includes two high voltage electric wires 102 and 103 and a covering member 104. The high voltage electric wire 102 is provided as a plus circuit, whilst the high voltage electric wire 103 is provided as a minus circuit. The high voltage electric wires 102 and 103 are the same conducting paths. A conducting path having the same size as that of the first conducting path 18 and the first insulator 19 that make up the coaxial conducting wire 15 is used for the high voltage electric wires 102 and 103. Each of the high voltage electric wires 102 and 103 includes a conductor 105 and an insulator 106. The high voltage electric wires 102 and 103 are placed side by side.

Clearance S2a and larger clearance S2b exist between the high voltage electric wires 102 and 103 placed side by side and the covering member 104.

The covering member 104 is formed into a circular pipe shape. The covering member 104 is set so as to be same thickness as that of the covering member 16 making up the coaxial conducting wire 15. The size of the covering member 104 is also set in such a way that the clearance S2a becomes equal to the clearance S1 between the coaxial conducting wire 15 and the covering member 16. Specifically, the covering member 104 is given the clearance S2a that is equal to the clearance S1 and formed to the same thickness as that of the covering member 16. An outer diameter of the covering member 104 is D2.

In FIGS. 2B and 2C, as can be seen from the coaxial conducting wire 15 and the covering member 16, the two high voltage electric wires 102 and 103 positioned side by side, and the covering member 104, the coaxial conducting wire 15 is understood to be smaller in width than the two high voltage electrical wires 102 and 103 placed side by side. Further, the covering member 16 is also smaller in width than the covering member 104 (D1<D2). Specifically, the coaxial conducting wire 15 and the covering member 16 become smaller than the comparative example.

Accordingly, realizing the coaxial conducting wire 15 by means of coaxial arrangement of a plurality of circuits makes it possible to miniaturize the coaxial conducting wire 15. Attempting a reduction in the diameter of the coaxial conducting wire 15 also makes it possible to reduce the diameter of the covering member 16 that accommodates the coaxial conducting wire 15 having such a small diameter.

Since the smaller diameters are achieved as mentioned, the wire harness 9 can be routed with a larger distance from the ground when routed at the predetermined position on the hybrid automobile 1.

As can be seen from FIG. 2B, occupancy of the clearance S1 existing between the coaxial conducting wire 15 and the covering member 16 has become smaller (i.e., an air layer is small). Accordingly, even if an amount of heat building up in the coaxial conducting wire 15 is large, the space can be filled with heat is small, thereby the space can be cooled by the covering member 16 before being filled with heat. The coaxial conducting wire 15, due to its own weight or an extra length, is configured so as to make a comparatively large contact with the interior surface of the covering member 16. Accordingly, the heat building up in the coaxial conducting wire 15 is transmitted to the covering member 16, thereby a high cooling function can be obtained.

In the case of a comparative example shown in FIG. 2C, occupancy of the clearances S2a and S2b existing between the two high voltage electric wires 102 and 103 placed side by side and the covering member 104 has become larger (the air layer is particularly large). Therefore, a space where the heat stays therein is large, cooling action provided by the covering member 104 will become insufficient for cooling. Since the contact on the interior surface of the covering member 104 is small, a cooling function may be deteriorated.

As compared with the comparative example, the wire harness 9 is excellent in terms of a heat radiation effect. Specifically, the wire harness 9 exhibiting a superior heat radiation property can also be provided under the invention.

Incidentally, in the wire harness 101 acting as the comparative example, respective terminals of the two high voltage electric wires 102 and 103 are expected to have terminal. A position of the terminal must be brought into alignment with a connection section set on a predetermined position on equipment (an inverter unit or a battery). An entire routing path of the wire harness 101 will not become straight in a direction of its entire length. The wire harness 101 is usually routed with bends at some midpoints. As a consequence, the following problems will be encountered in aligning the position of the terminal.

Specifically, in a state where the covering member 104 is bent while the two high voltage electric wires 102 and 103 are inserted into the covering member 104 (a metal pipe), a bent states is different between an inner radius side and an outer radius side of each of the bends. The high voltage electric wires differ from each other in terms of a bend radius. Differences exist in as many bends. For this reason, positions of the ends of the high voltage electric wires 102 and 103 become out of alignment with each other, which raises a problem of occurrence of a comparative large misalignment in a terminal portion of the wire harness 101. This may cause a hindrance to connection of the wire harness to equipment. To cope with this, terminals of the electric wires must be processed (trimmed) before attachment of the terminal, which will raise a problem of an increase in man hour. Moreover, trimming of the electric wires or attachment of the terminal can be performed only after the covering member 104 has been bent, which presents a problem of poor workability.

In connection with the drawbacks, the wire harness 9 of the invention uses the coaxial conducting wire 15 coaxially including a plurality of circuits, and the covering member 16 accommodates the coaxial conducting wire 15. Therefore, even if the covering member 16 is bent, the coaxial conducting wire 15 having a configuration of a single path will not encounter a problem of misalignment of end positions. Specifically, a necessity for trimming work is obviated, which in turn enables attachment of terminal before bending of the covering member 16. If attachment of the terminal becomes feasible before bending, bending work can be changed to a final step. For example, if a bender machine is installed in a vicinity of a line for routing the wire harness 9 on the hybrid automobile 1, conveyance of a product can be carried out along a straight line up to this location. In other words, conveying the product while the wire harness is bent causes a problem of requirement of a larger space. In contrast, if the product can be conveyed in a straightforward manner, an attempt can be made to save the space. Space saving achieved during conveyance is also effective for curtailing cost.

In addition, if the coaxial conducting wire 15 having a single configuration is adopted as mentioned above, a problem of misalignment of end positions will not occur. Therefore, even if there is a change in bend position, the change can be achieved in a short delivery deadline.

As has been described by reference to FIGS. 1A and 1B and FIGS. 2A to 2C, the wire harness 9 of the invention enables a reduction in diameter of the covering member 16. Moreover, even when compared with the wire harness 101 that is the comparative example, the wire harness 9 can be made useful more significantly.

Figure 3A:
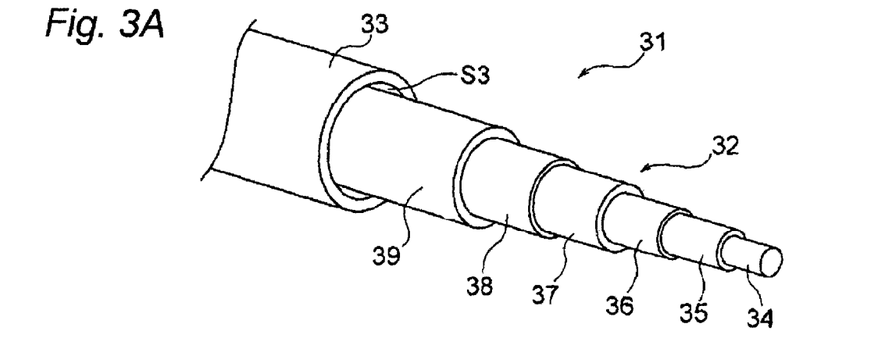
FIG. 3A is a schematic illustration of a wire harness according to a second embodiment of the invention.
Figure 3B:
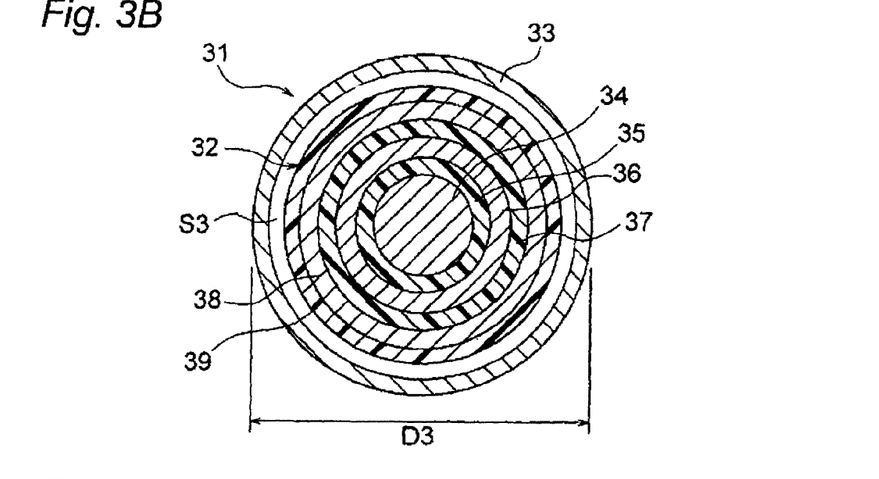
FIG. 3B is a cross section of the wire harness shown in FIG. 3A.
Figure 3C:
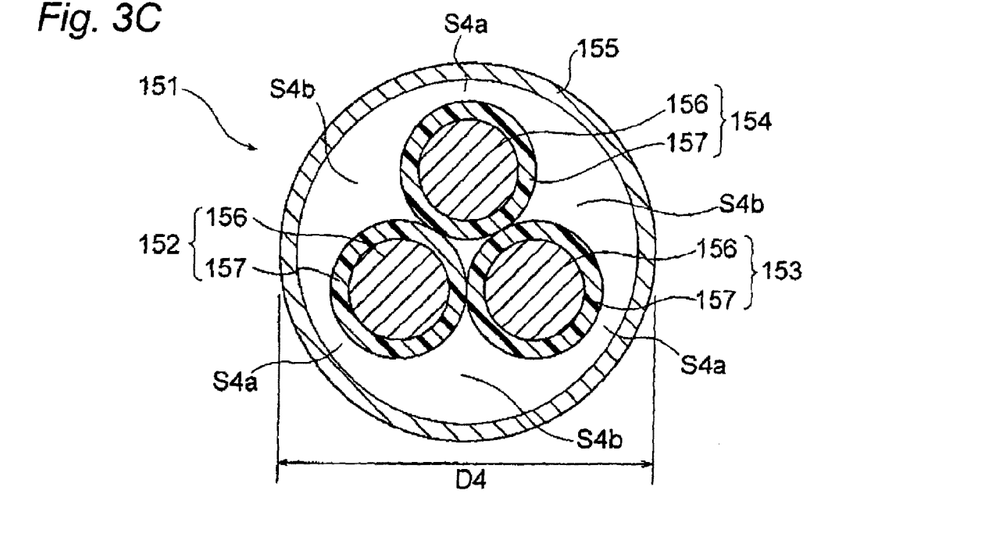
FIG. 3C is a cross section of a wire harness of a comparative example.

A second embodiment is hereunder described by reference to the drawings. FIG. 3A is a schematic illustration of a wire harness of another example. FIG. 3B is a cross section of the wire harness shown in FIG. 3A. FIG. 3C is a cross section of a wire harness of a comparative example.

In FIGS. 3A to 3B, a wire harness 31 is a high voltage member and includes a coaxial conducting wire 32 and an covering member 33. Although unillustrated, the electromagnetic shield member is assumed to be identical with; for instance, the electromagnetic shield member described in connection with the first embodiment.

The coaxial conducting wire 32 is configured so as to include three paths (triple circuitry) in the form of a single wire. Specifically, the coaxial conducting wire 32 includes a first conducting path 34 that is situated at a center of the coaxial conducting wire 32 and that assumes a circular cross sectional profile; a first insulator 35 that sheathes an outer periphery of the first conducting path 34 in a predetermined thickness; a second conducting path 36 laid outside the first insulator 35; a second insulator 37 that sheathes an outer periphery of the second conducting path 36 in a predetermined thickness; a third conducting path 38 laid outside the second insulator 37; and a third insulator 39 that sheathes an outer periphery of the third conducting path 38 in a predetermined thickness.

In relation to a configuration of the coaxial conducting wire 32, given that the coaxial conducting wire 32 is connected to; for instance, a motor, the first conducting path 34, the second conducting path 36, and the third conducting path 38 correspond to three conducting paths (three paths) for three phase AC currents.

The first conducting path 34 is manufactured from copper, a copper alloy, aluminum, or an aluminum alloy. The first conducting path 34 can also adopt a conductor structure made by twisting strands or a rod-shaped conductor structure assuming; for instance, a circular cross sectional profile. A conductor structure will make up a round single core.

The first insulator 35 is a sheath for the first conducting path 34 and formed by extruding a resin material.

The second conducting path 36 is manufactured from copper, a copper alloy, aluminum or an aluminum alloy. The second conducting path 36 is identical with the second conducting path 20 described in connection with the first embodiment, and its explanation is omitted here for brevity.

The second insulator 37 is a sheath for the second conducting path 36 and formed by extruding a resin material.

The third conducting path 38 is manufactured from copper, a copper alloy, aluminum or an aluminum alloy. The third conducting path 38 is identical with the second conducting path 36 and the second conducting path 20 described in connection with the first embodiment, and its explanation is omitted here for brevity.

The third insulator 39 is a sheath for the third conducting path 38 and formed by extruding a known resin material. In addition to being formed as a portion for protecting the third conducting path 38, the third insulator 39 is formed as a portion for insulating a member that exhibits a shield function from the third conducting path 38.

Although different in size, the covering member 33 is configured basically in the same manner as is the covering member 16 of the first embodiment. Since a thing to be accommodated by the covering member 33 is the coaxial conducting wire 32, an outer diameter D3 of the covering member 33 is set to a comparatively small value.

The reason why the outer diameter D3 is comparatively small is that the coaxial conducting wire 32 adopts a single wire which coaxially includes a plurality of paths and that the covering member 33 is formed in a size at which the covering member accommodates the coaxial conducting wire 32. While the comparative example is being explained, explanations are given to a case where the covering member 33 becomes smaller in diameter than the comparative example.

In FIG. 3B, the coaxial conducting wire 32 is accommodated in the covering member 33. Clearance S3 that is the minimum required at the time of insertion of the coaxial conducting wire 32 is provided between the covering member 33 and the coaxial conducting wire 32. The clearance S3 is equal to the clearance S1 described in connection with the first embodiment. An outer diameter of the covering member 33 is D3.

In FIG. 3C, a wire harness 151 of a comparative example includes three high voltage electric wires 152, 153, and 154 and an covering member 155. The high voltage electric wires 152, 153, and 154 are all the same conducting paths which are of the same size as that of the first conducting path 34 and the first insulator 35 which make up the coaxial conducting wire 32. Each of the high voltage electric wires 152, 153, and 154 includes a conductor 156 and an insulator 157. The high voltage electric wires 152, 153, and 154 are arranged while tied in a triangular shape.

Clearance S4a and larger clearance S4b exist between the high voltage paths 152, 153, and 154 tied in the triangular shape and the covering member 155. The covering member 155 is formed into a circular pipe shape. Although different in size, the covering member 155 is configured basically in the same manner as is the covering member 104 (see FIG. 2C). An outer diameter of the covering member 155 is D4.

In FIGS. 3B and 3C, as can be seen from the coaxial conducting wire 32, the covering member 33, the triangularly tied high voltage electric wires 152, 153, and 154, and the covering member 155, it is understood that a width of the coaxial conducting wire 32 is narrower than a width of an unillustrated circumcircle of the high voltage electric wires 152, 153, and 154 tied in the triangular shape and also that the width of the covering member 33 is also smaller than that of the covering member 155 (D3<D4). In other words, the diameter of the coaxial conducting wire 32 and the diameter of the covering member 33 are understood to be made smaller.

Accordingly, the plurality of circuits are coaxially arranged into the coaxial conducting wire 32, whereby miniaturization of the coaxial conducting wire 32 can be achieved. A decrease in diameter of the coaxial conducting wire 32 also makes it possible to reduce the diameter of the covering member 33 that accommodates the coaxial conducting wire 32 having such a small diameter.

Since the smaller diameters are accomplished as mentioned above, when routed at a predetermined position on the hybrid automobile 1 (see FIGS. 1A and 1B), the wire harness 31 can be routed at a larger distance from the ground. Advantages yielded by the wire harness 31 shall be identical with those described in connection with the first embodiment.

Figure 4A:
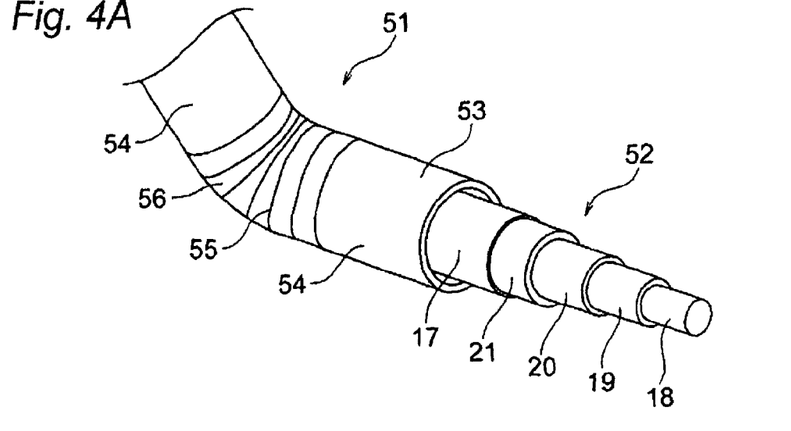
FIGS. 4A to 4C are schematic illustrations of a wire harness according to a third embodiment of the invention, in which a resin tubular body is made by a combination of a shape of a straight pipe with a shape of a bellows.
Figure 4B:
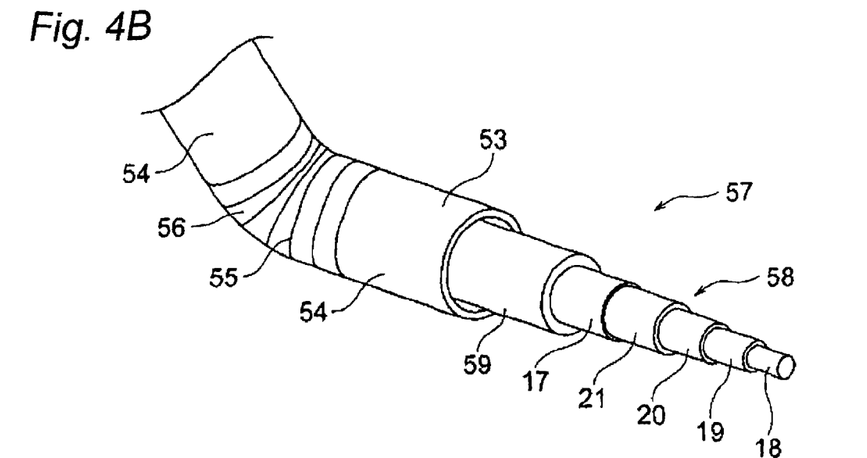
Figure 4C:
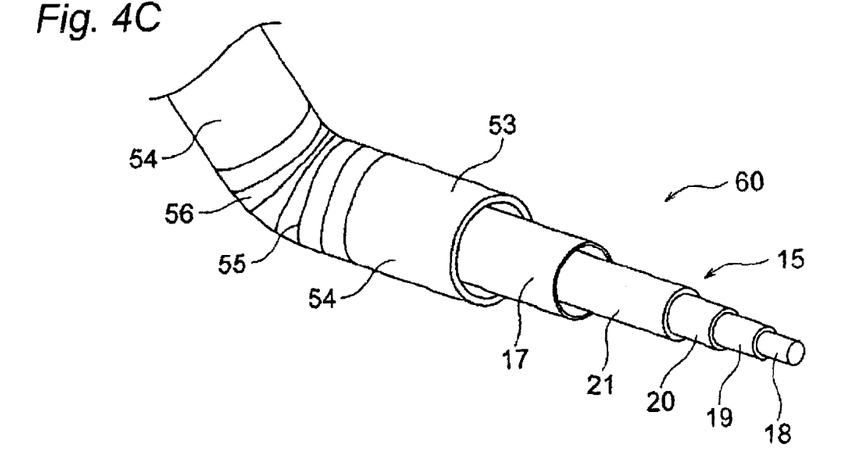

A third embodiment is hereunder described by reference to the drawings. FIGS. 4A to 4C are schematic illustrations of a wire harness that is to be still another example.

In FIG. 4A, a wire harness 51 is a high voltage member and includes the electromagnetic shield member 17, a coaxial conducting wire 52, and an covering member 53.

The coaxial conducting wire 52 is configured so as to include two paths (double circuitry) in the form of a single wire. The coaxial conducting wire 52 is also configured in such a way that the electromagnetic shield member 17 coaxial to the two circuits is disposed outside the two circuits. Specifically, the coaxial conducting wire 52 is configured by inclusion of the first conducting path 18 that is situated at the center of the coaxial conducting wire 52 and that has a circular cross sectional profile, the first insulator 19 that sheathes the outer periphery of the first conducting path 18 in a predetermined thickness, the second conducting path 20 disposed outside the first insulator 19, the second insulator 21 that sheathes the outer periphery of the second conducting path 20 in a predetermined thickness, and the electromagnetic shield member 17 placed in close contact with an exterior surface of the second insulator 21. The elements that are identical with their counterparts described in connection with the first embodiment are assigned the same reference numerals, and their detailed descriptions are omitted. The same also applies to any counterparts in the followings.

The electromagnetic shield member 17 shown in FIG. 4A is formed from a known braid, metal foil, or the like. The electromagnetic shield member 17 in a sheet-like state is tied, while remaining in close contact with, around an exterior surface of the second insulator 21. Anchoring means for maintaining the electromagnetic shield member in a tied state is selected as appropriate. The electromagnetic shield member 17 exhibits flexibility and is formed so as to become thinner than; for instance, the second conducting path 20. The electromagnetic shield member 17 shown in FIG. 4A comes into close contact with the exterior surface of the second insulator 21, so that it becomes part of a structure of the coaxial conducting wire 52.

The covering member 53 is a tubular body made of a resin, or a resin tubular body, and formed so as to assume a length required to accommodate the coaxial conducting wire 52 and a thickness required to protect the coaxial conducting wire 52. The covering member 53 is formed so as to assume a circular cross sectional profile. The cross sectional profile is a mere example and may have an ellipsoidal shape, an oval shape, or a rectangular shape. The covering member 53 shown in FIG. 4A is formed into an illustrated shape made by combination of a non-bend pipe portion 54 that is not bent during routing with a bend pipe portion 56 to be bent during routing. The non-bend pipe portion 54 and the bend pipe portion 56 are formed in a continued manner. The bend pipe portion 56 of the embodiment is formed into the shape of a bellows pipe that has asperities 55 formed in a circumferential direction and that exhibits flexibility or elasticity. The shape of the bend pipe portion 56 shall not be restricted to the shape of a bellows pipe. The bend pipe portion 56 shall assume another shape, so long as the bend pipe portion exhibits flexibility or elasticity and causes a bend during routing work. In the embodiment, the covering member 53 is formed into a shape that partially includes a corrugated tube.

The non-bend pipe portion 54 is formed as a portion that regulates a bend or a portion where a clamp (an anchoring member) is to be mounted during routing. Since the non-bend pipe portion 54 is formed into a straight pipe shape as illustrated, the non-bend pipe portion can be called a "straight pipe portion."

Since the covering member 53 has a portion corresponding to a corrugated tube as mentioned above, the covering member 53 can also be called a "corrugated tube" or a "partially-formed corrugated tube."

As a matter of course, the wire harness 51 shown in FIG. 4A exhibits an advantage similar to that exhibited in the first embodiment, and the coaxial conducting wire 52 can exhibit a shielding function by itself. Moreover, since the covering member 53 is formed into a resin tubular body, it is also possible to reduce the weight of the wire harness 51 while sufficient strength is assured.

In FIG. 4B, a wire harness 57 is a high voltage member as mentioned above and includes a coaxial conducting wire 58 having the electromagnetic shield member 17 and the covering member 53 having the non-bend pipe portion 54 and the bend pipe portion 56.

The coaxial conducting wire 58 is formed so as to include two paths (double circuitry) in the form of a single wire. The coaxial conducting wire 58 is also configured in such a way that the electromagnetic shield member 17 coaxial to the two circuits is disposed outside the two circuits. Specifically, the coaxial conducting wire 58 is formed by inclusion of the first conducting path 18 that is situated at the center of the coaxial conducting wire 58 and that has a circular cross sectional profile, the first insulator 19 that sheathes the outer periphery of the first conducting path 18 in a predetermined thickness, the second conducting path 20 disposed outside the first insulator 19; the second insulator 21 that sheathes the outer periphery of the second conducting path 20 in a predetermined thickness, the electromagnetic shield member 17 placed outside the second insulator 21 and a sheath 59 that sheathes the outer periphery of the electromagnetic shield member 17 in a predetermined thickness.

The electromagnetic shield member 17 shown in FIG. 4B is included in the configuration of the coaxial conducting wire 58. The coaxial conducting wire 58 is configured by addition of the sheath 59 to the coaxial conducting wire 52 shown in FIG. 4A.

Accordingly, it is natural that the wire harness 57 shown in FIG. 4B has the same advantages as those mentioned above.

In FIG. 4C, a wire harness 60 is a high voltage member in the same manner as mentioned above. The wire harness 60 is configured by inclusion of the coaxial conducting wire 15 similar to that described in connection with the first embodiment, the covering member 53 including the non-bend pipe portion 54 and the bend pipe portion 56, and the tubular electromagnetic shield member 17 interposed therebetween. The electromagnetic shield member 17 is formed from a known braid, a metal foil, or the like. In FIG. 4C, the electromagnetic shield member 17 is not included in the configuration of the coaxial conducting wire 15 and provided as a separate member. The electromagnetic shield member 17 shown in FIG. 4A is formed so as to come into close contact with the exterior surface of the second insulator 21, whilst the electromagnetic shield member 17 shown in FIG. 4C is formed so as to become slightly baggy. The electromagnetic shield member 17 shown in FIG. 4C is formed into a tubular shape and arranged coaxially to the circuit of the coaxial conducting wire 15.

Accordingly, it is natural that the wire harness 60 shown in FIG. 4C has the same advantage as those mentioned above.

Figure 5A:
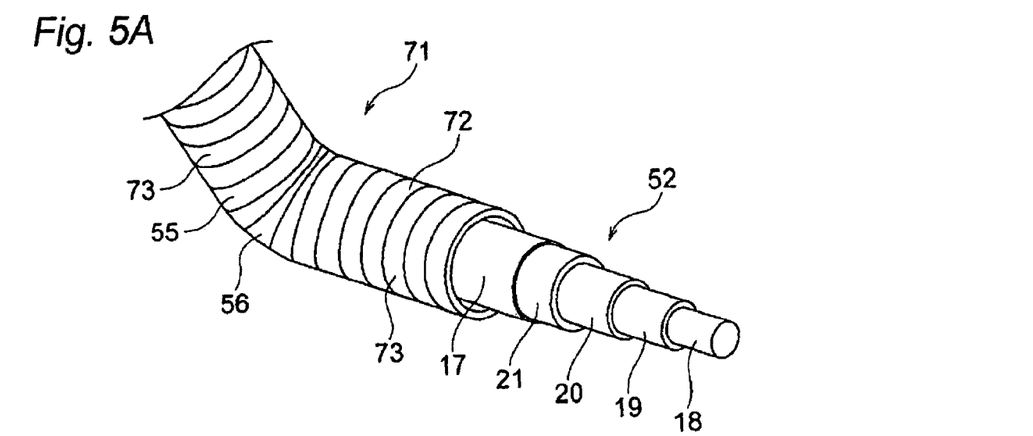
FIGS. 5A to 5C are schematic illustrations of a wire harness according to a fourth embodiment of the invention, which is to be a modification of the wire harness shown in FIGS. 4A to 4C. In the fourth embodiment, a resin tubular body has a shape of a bellows.
Figure 5B:
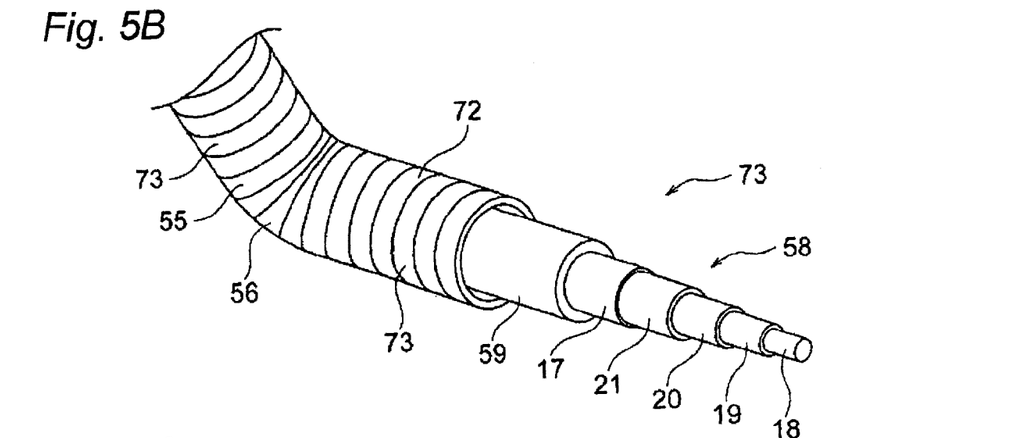
Figure 5C:
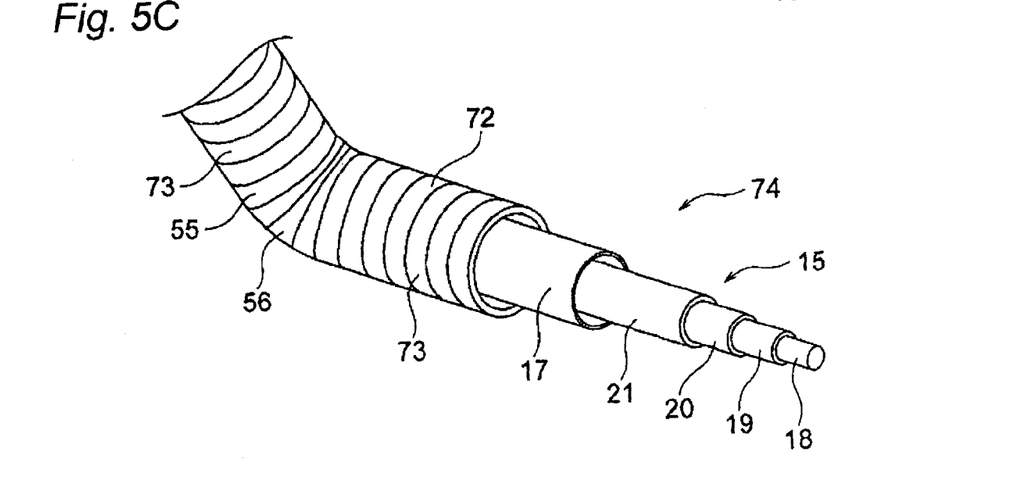

A fourth embodiment is hereunder described by reference to the drawings. FIGS. 5A to 5C are schematic illustrations of a wire harness that is to be an exemplary modification of the wire harness shown in FIGS. 4A to 4C.

In FIG. 5A, a wire harness 71 is materialized by making a change to the covering member of the wire harness 51 of the third embodiment. Specifically, the wire harness 71 is configured by inclusion of the coaxial conducting wire 52 in close contact with the exterior surface of the second insulator 21 and a covering member 72.

The covering member 72 is a tubular body made of a resin, or a resin tubular body, and formed so as to assume a length required to accommodate the coaxial conducting wire 52 and a thickness required to protect the coaxial conducting wire 52. The covering member 72 is formed so as to assume a circular cross sectional profile. The cross sectional profile is a mere example and may also be an ellipsoidal shape, an oval shape, or a rectangular shape. In the embodiment, the covering member 72 shown in FIG. 5A is entirely formed into the shape of a bellows pipe (which shall be a mere example) that has the asperities 55 formed in a circumferential direction and that exhibits flexibility. The covering member 72 is made by combination of a non-bend pipe portion 73 that is not bent during routing with the bend pipe portion 56 to be bent during routing. A tubular shape analogous to a known corrugated tube is adopted for the covering member 72 of the embodiment.

In FIG. 5B, a wire harness 73 is materialized by making a change to the covering member of the wire harness 57 of the third embodiment in the same manner as shown in FIG. 5A. Specifically, the wire harness 73 is formed by inclusion of a coaxial conducting wire 58 having the electromagnetic shield member 17 and the covering member 72.

In FIG. 5C, a wire harness 74 is materialized by making a change to the covering member of the wire harness 60 of the third embodiment in the same manner as shown in FIG. 5A. Specifically, the wire harness 74 is formed by inclusion of the coaxial conducting wire 15, the covering member 72, and the tubular electromagnetic shield member 17 interposed therebetween.

The fourth embodiment is an exemplary modification of the third embodiment and, as a matter of course, useful even when the fourth embodiment is adopted.

Figure 6A:
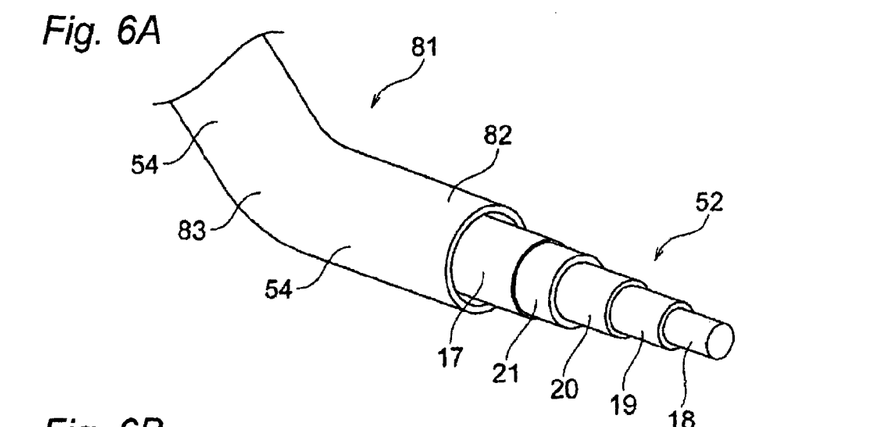
FIGS. 6A to 6C are schematic illustrations of a wire harness according to a fifth embodiment of the invention, which is a modification of the wire harness shown in FIGS. 4A to 4C. In the fifth embodiment, a resin tubular body has a shape of a straight pipe.
Figure 6B:
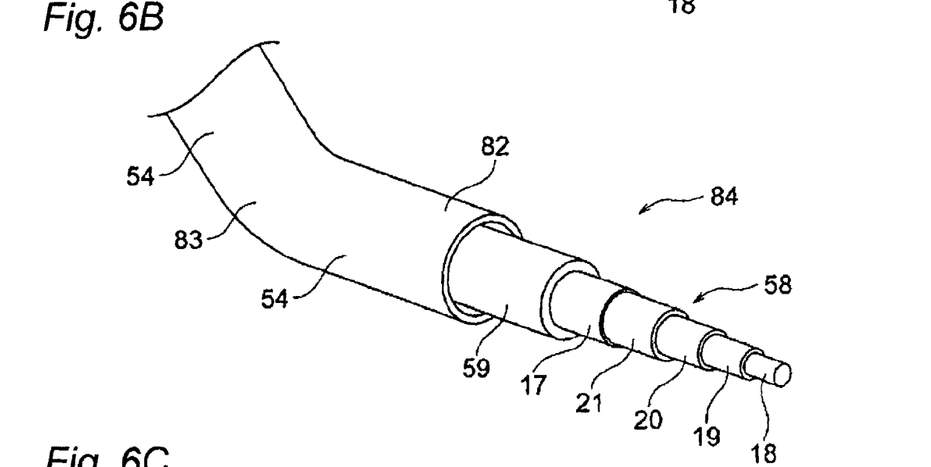
Figure 6C:
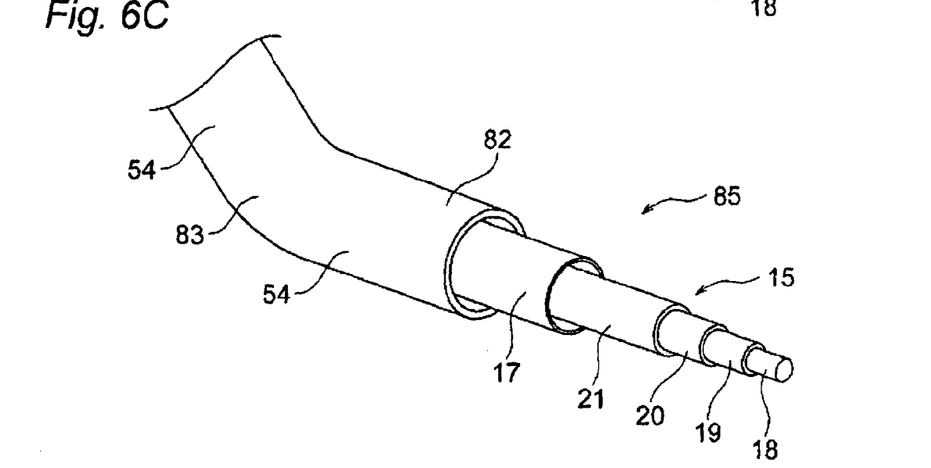

A fifth embodiment is hereunder described by reference to the drawings. FIGS. 6A to 6C are schematic illustrations of a wire harness that is to be an exemplary modification of the wire harness shown in FIGS. 4A to 4C.

In FIG. 6A, a wire harness 81 is materialized by making a change to the covering member of the wire harness 51 of the third embodiment. Specifically, in the wire harness 81, the electromagnetic shield member 17 is configured by inclusion of the coaxial conducting wire 52 in close contact with the exterior surface of the second insulator 21 of and a covering member 82.

The covering member 82 is a tubular body made of a resin, or a resin tubular body, and formed so as to assume a length required to accommodate the coaxial conducting wire 52 and a thickness required to protect the coaxial conducting wire 52. The covering member 82 is formed so as to assume a circular cross sectional profile. The cross sectional profile is a mere example and may also be an ellipsoidal shape, an oval shape, or a rectangular shape. The covering member 82 shown in FIG. 6A is entirely formed into a shape that has the non-bend pipe portion 54 and a bend pipe portion 83 and that is devoid of asperities provided along a circumferential direction of the covering member 82. In the embodiment, the bend pipe portion 83 is formed as a bend part that is to be bent by heating, or the like. Although the covering member 82 is a resin tubular body, the covering member has a similar appearance even when formed into a metal tubular body.

In FIG. 6B, a wire harness 84 is materialized by making a change to the covering member of the wire harness 57 of the third embodiment in the same manner as shown in FIG. 6A. Specifically, the wire harness 84 is formed by inclusion of the coaxial conducting wire 58, the covering member 82, and the tubular electromagnetic shield member 17 interposed therebetween.

In FIG. 6C, a wire harness 85 is materialized by making a change to the covering member of the wire harness 60 of the third embodiment in the same manner as shown in FIG. 6A. Specifically, the wire harness 85 is formed by inclusion of the coaxial conducting wire 15, the covering member 82, and the tubular electromagnetic shield member 17 interposed therebetween.

The fifth embodiment is an exemplary modification of the third embodiment and, as a matter of course, useful even when the fifth embodiment is adopted.

Figure 7:
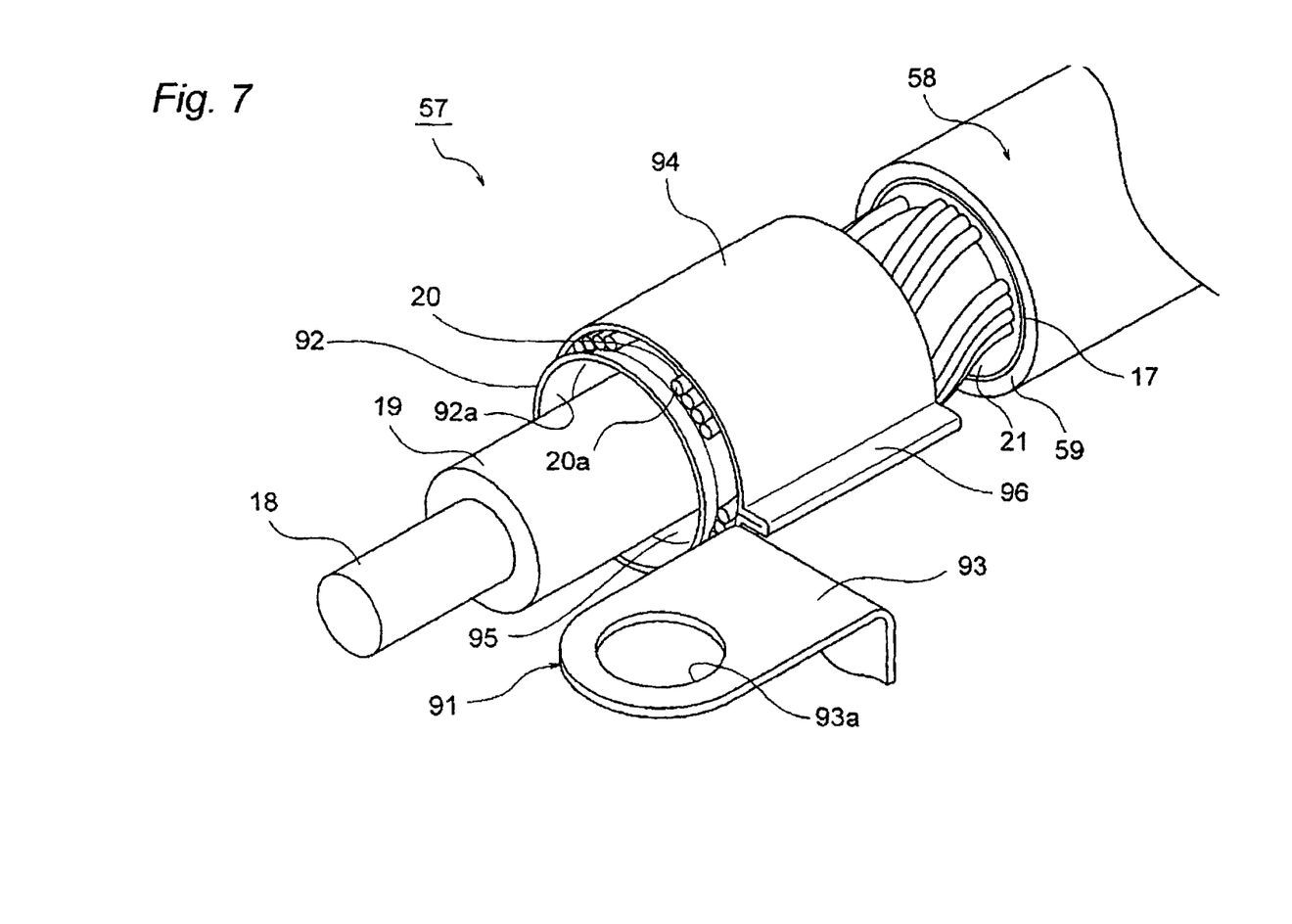
FIG. 7 is a perspective view showing a coupling structure of a wire harness according to a sixth embodiment of the invention.
Figure 8:
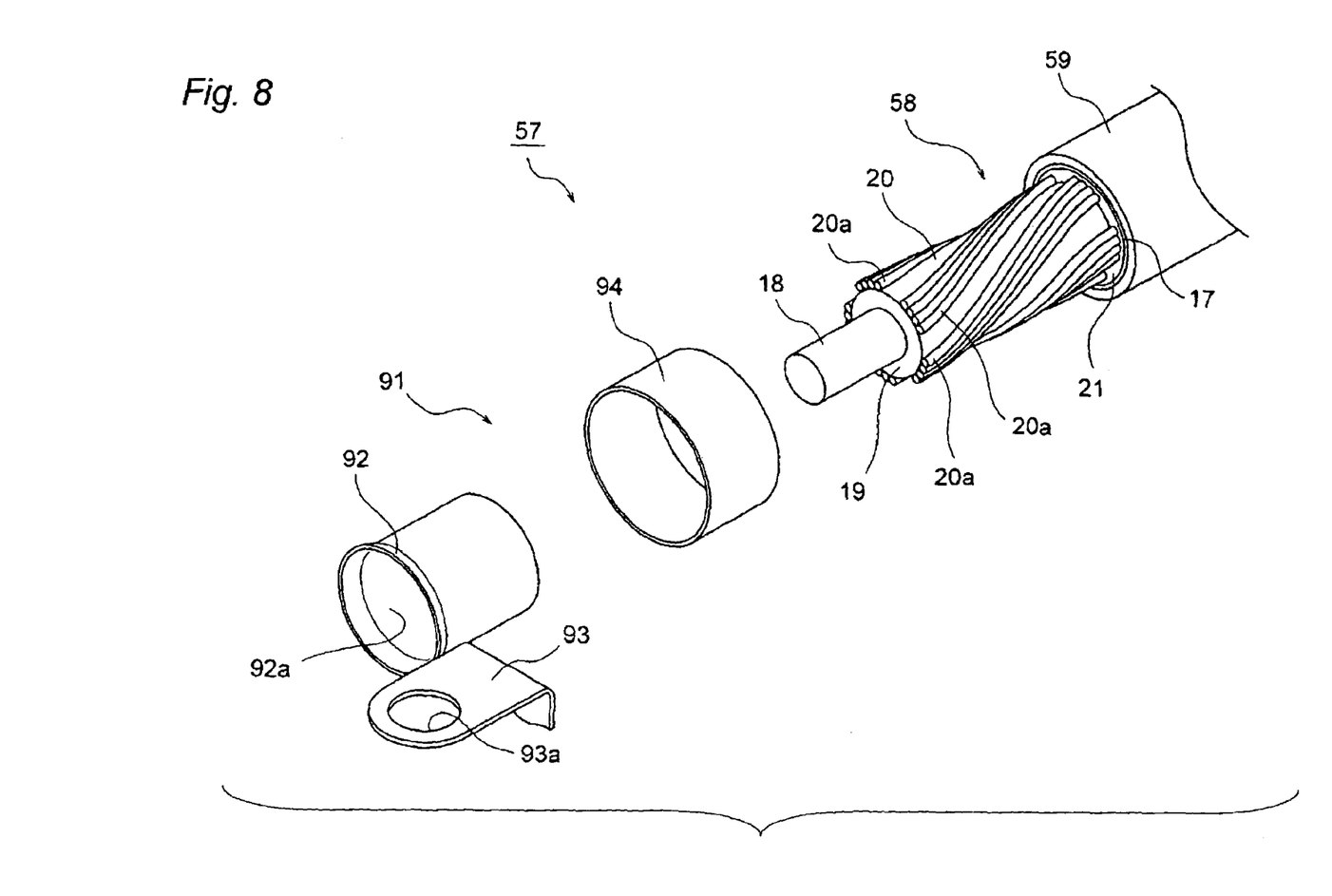
FIG. 8 is an exploded perspective view of the coupling structure shown in FIG. 7.
Figure 9:
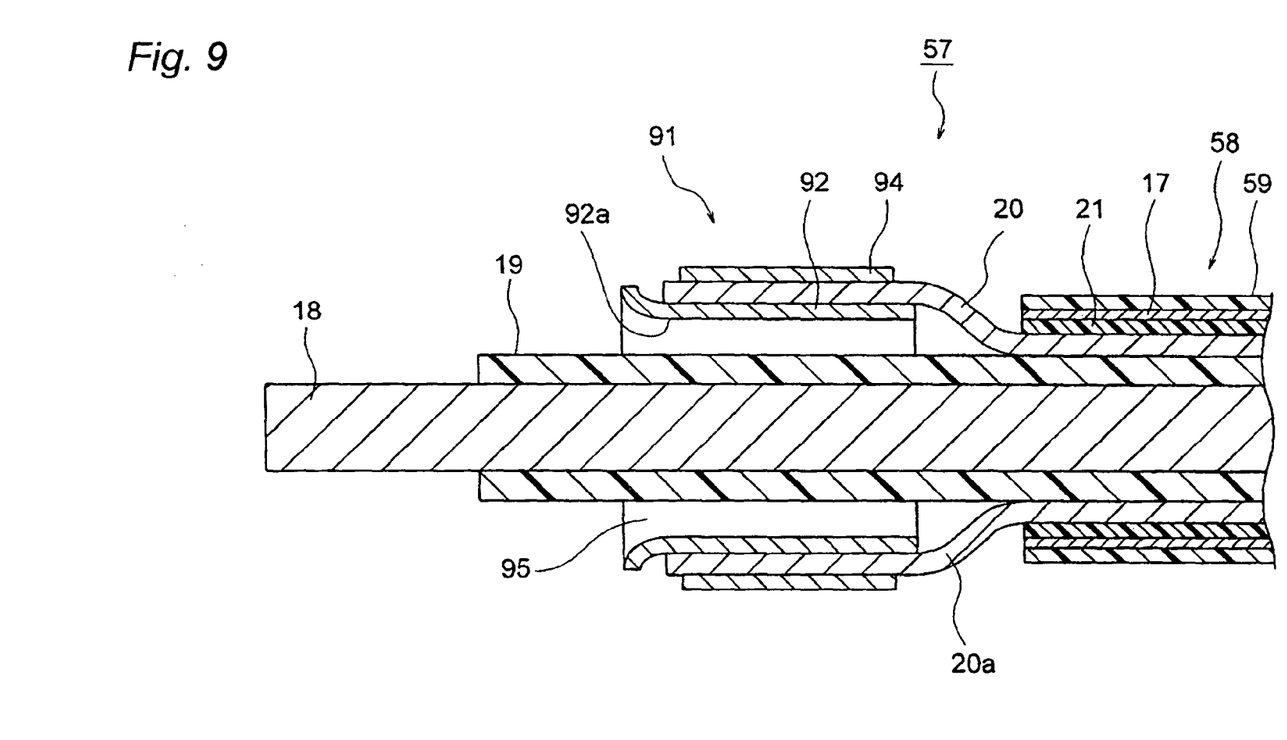
FIG. 9 is a cross section of the coupling structure shown in FIG. 7.

A sixth embodiment is hereunder described by reference to the drawings. FIG. 7 is a perspective view showing a coupling structure of the wire harness. FIG. 8 is an exploded perspective view of the coupling structure shown in FIG. 7. FIG. 9 is a cross section of the coupling structure shown in FIG. 7.

In FIGS. 7 through 9, explanations are given to a coupling structure of the wire harness 57 in the sixth embodiment by use of the coaxial conducting wire 58 of the third embodiment.

The second conducting path 20 in the coaxial conducting wire 58 is an outside circuit described in the claims and formed from a plurality of conductive strands 20a which is made of the same material (aluminum or an aluminum alloy) as that of the first conducting path 18 in the present embodiment. The plurality of strands 20a are used in an unbraided manner unlike a known braided wire and placed in a predetermined state on an exterior surface of the first insulator 19. Specifically, the plurality of strands 20a are placed, while remaining spirally twisted, on the exterior surface of the first insulator 19. In the embodiment, the four strands 20a are taken as one set, and five sets of the strands 20a are placed, while remaining spirally twisted, on the exterior surface of the first insulator 19. The number of the strands 20a and the number of the sets of the strands 20a shall be mere examples.

The inner first conducting path 18 is formed from a twisted line conductor made up of 19 strands in the embodiment (omitted from the drawings). The number of strands shall be a mere example.

The second conducting path 20 is materialized by placing the plurality of strands 20a in a twisted manner; hence, the length of the second conducting path 20, as a conductor, becomes longer than the first conducting path 18. For these reasons, the number of the strands 20a making up the second conducting path is made larger than the number of the strands making up the first conducting path 18 by one, thereby making a conductor cross sectional area of the second conducting path slightly larger than that of the first conducting path, to thus absorb a difference in conductor length.

A terminal of the coaxial conducting wire 58 is processed such that its respective constituent portions become bare in a predetermined length. Terminal 91 for an external circuit is connected to a terminal of the second conducting path 20, which is an example coupling structure of the wire harness 57.

The terminal 91 for an outside circuit has a tubular portion that becomes coaxial to the coaxial conducting wire 58. Specifically, the terminal 91 has an connection tubular portion 92 (a tubular portion) inserted between the exterior surface of the first insulator 19 and the second conducting path 20. In addition to including the connection tubular portion 92, the terminal 91 for an outside circuit has a terminal 93 and a crimping tubular portion 94.

The connection tubular portion 92 is formed into a size at which a space 95 of predetermined size exists between an interior surface 92a of the connection tubular portion 92 and the exterior surface of the first insulator 19. A core cylinder (omitted from the drawings) is inserted into the space 95 during crimping operation to be described later.

The terminal 93 is a tab-shaped electrical contact portion integrated into a single piece along with the connection tubular portion 92 and formed so as to enable establishment of an electrical connection with the outside. In the embodiment, a bolt insert hole 93a is formed in a penetrating manner.

The crimping tubular portion 94 is a tubular member used for crimping the second conducting path 20 to the connection tubular portion 92 and is to be inserted into the coaxial conducting wire 58 in advance. Further, after being inserted, the connection tubular portion 92 is slid and positioned inside the second conducting path 20. When the crimping tubular portion 94 is crimped by means of a known method, the crimping tubular portion 94 is diametrically reduced, thereby making it possible to press the second conducting path 20 against the connection tubular portion 92. Specifically, an electrical connection can be completed.

In the embodiment, the crimping tubular portion 94 is formed into a size at which the crimping tubular portion 94 is diametrically reduced by an amount equivalent to a collapse allowance 96 (see FIG. 7).

Adopting the second conducting path 20 and the coupling structure, such as those described above, are effective.

The above-mentioned embodiment is merely a typical example of the present invention, and the present invention is not limited to the embodiment. That is, the present invention can be variously modified and implemented without departing from the essential features of the present invention.

The coaxial conducting wire 15 includes double circuitry (two paths) coaxially aligned in the form of a single wire. The coaxial conducting wire 32 includes triple circuitry (three paths) coaxially aligned in the form of a single wire. However, the coaxial conducting wire is not restricted to those mentioned above and may also be formed by coaxially tying n-channel paths ("n" circuits) into the form of a single wire.

For instance, a low voltage fine conducting path (a low voltage electric wire) can also be accommodated in conjunction with the coaxial conducting wire by utilization of; for example, the clearance S1 existing between the coaxial conducting wire 15 and the covering member 16.

According to the above, in the present invention, when the width of the coaxial conducting wire including a plurality of coaxially aligned circuits is compared with a width of a high voltage conducting path including a plurality of thick conducting paths arranged side by side, or a width of a high voltage conducting path that is a bundle of a plurality of conducting paths, the width of the coaxial conducting wire becomes smaller. Specifically, if the coaxial conducting wire is adopted, an attempt can be made to reduce the diameter of the wire harness even when a plurality of circuits are included. Thereby, it becomes possible to reduce a diameter of a covering member that accommodates a small-diameter coaxial conducting wire.

According to the invention, the coaxial conducting wire further includes the shield member; therefore, the coaxial conducting wire can exhibit a shielding function by itself. Imparting the shielding function to the coaxial conducting wire is effective for miniaturization when compared with a case where a component dedicated to shielding is separately provided. Incidentally, under the present invention, the coaxial conducting wire is invariably housed. Hence, the covering member keeps a small diameter, and the wire harness also keeps a small diameter.

According to the invention, the covering member is formed from a metal tubular body or a resin tubular body. When the covering member is a metal tubular body, a function of protecting the coaxial conducting wire can be enhanced. Moreover, when the covering member is a metal tubular body, the exterior tubular body itself can exhibit the shielding function. In the meantime, when the covering member is a resin tubular body, the weight of the covering member can be reduced while necessary and sufficient strength is assured when compared with a case where the covering member is a metal tubular body.

When the covering member is a metal tubular body and when the coaxial conducting wire is not imparted with the shielding function, the covering member can house and protect the coaxial conducting wire and double also as a shield member. When compared with a case where a component dedicated to shielding is separately provided, a radial size of the wire harness can be made smaller by imparting the shielding function to the covering member.

When the covering member is a metal tubular body and when the coaxial conducting wire is imparted with the shielding function, the covering member invariably accommodates the coaxial conducting wire. Hence, the covering member keeps a small diameter, and the wire harness also keeps a small diameter.

When the covering member is a resin tubular body, imparting the shielding function to the coaxial conducting wire and interposing a thin shield member between the coaxial conducting wire and the covering member are effective.

According to the invention, the covering member has the bend pipe portion and the non-bend pipe portion. The bend portion turns into a portion to be bent during routing, and the non-bend portion turns into a portion not to be bent during routing. Hence, the wire harness can be routed along a desired route.

According to the invention, the coaxial conducting wire has a plurality of high voltage paths. The outside one of the plurality of circuits is made up of a plurality of conductive strands. Specifically, using strands having a small diameter results in a reduction in thickness of the outside circuit, which leads to a smaller diameter. Moreover, according to the invention, the plurality of strands are used without braiding the plurality of strands. Hence, a pileup of strands, which would otherwise be caused by braiding, can be prevented, as a result of which the thickness of the outside circuit is reduced, to thereby accomplish a smaller diameter. Furthermore, according to the invention, the outside circuit is made up of a plurality of strands, and the plurality of strands are arranged, while being spirally twisted, on the exterior surface of the insulator. Such a circuit makes it possible to enhance flexibility of the conducting path and make the plurality of strands less likely to spread out, thereby facilitating performance of; for instance, terminal work.

More detailed additional explanations are given to enhancement of flexibility. The plurality of strands are arranged straightforward along an axial direction of the conducting path, whilst the plurality of strands are arranged while being spirally twisted as described in connection with the invention. When the coaxial conducting wire is bent, the strands are subjected to different curvatures R. Further, an inner radius portion of a bend of the conducting path and an outer radius portion of the same differ from each other in terms of compression force and tensile force acting on the strands. Therefore, the cases differ from each other in terms of ease of flexure. Specifically, when the plurality of strands are arranged straightforward, the strands undergo bending R commensurate with a bend of the electrically conductive path. Moreover, compression force and tensile force act on the strands along its axis, so that the force acting on the strands becomes less easy to escape. In the meantime, in the invention, the curvature R that the strands undergo becomes greater. Moreover, the compression force and the tensile force obliquely act on sides of the strands, so that the force acting on the strands becomes easy to escape. Accordingly, from a comparison between the cases, bending force acting on the coaxial conducting wire becomes smaller than that acting on the high voltage conducting path including the plurality of straightly arranged strands. Arranging a plurality of strands in a spirally twisted pattern in the manner as mentioned in connection with the invention can be said to be advantageous in terms of ease of bending.

According to the invention, the wire harness further includes the terminal for an outside circuit connected to the outside circuit of the coaxial conducting wire. Since the terminal for an outside circuit has the tubular portion that becomes coaxial to the coaxial conducting wire, a coupling structure for the outside circuit can be minimized.

According to the invention, there can be provided a terminal for an outside circuit that minimizes a coupling structure for the outside circuit.

According to the present invention, there is provided a wire harness that enables a reduction in the diameter of a covering member.

What is claimed is:

1. A wire harness, comprising:
   a coaxial conducting wire including a plurality of high voltage paths which are coaxially aligned;
   a covering member, accommodating the coaxial conducting wire; and
   a terminal, connected to one of the high voltage paths disposed outside of another one of the high voltage paths, and including a tubular portion coaxial to the coaxial conducting wire,
   wherein the terminal includes a connection tubular portion as the tubular portion, a crimping tubular portion connecting the one of the high voltage paths to the connection tubular portion by crimping, and an outside connection terminal integrated with the connection tubular portion.

2. The wire harness according to claim 1, wherein the coaxial conducting wire further includes a shield member that is formed by metal and is coaxial to and disposed outside the plurality of high voltage paths.

3. The wire harness according to claim 1, wherein the covering member is formed from a metal tubular body covering the coaxial conducting wire or a resin tubular body covering the coaxial conducting wire.

4. The wire harness according to claim 3, wherein the covering member has a bend pipe portion configured to be bent during routing and a non-bend pipe portion continued to the bend pipe portion and configured not to be bent during routing.

5. The wire harness according to claim 1, wherein the coaxial conductive wire includes an insulator located between the high voltage paths,
   one of the high voltage paths disposed outside of another one of the high voltage paths is made up of a plurality of conductive strands, and
   the strands are spirally twisted on an exterior surface of the insulator.

* * * * *